(12) United States Patent
Jung et al.

(10) Patent No.: US 10,389,147 B2
(45) Date of Patent: Aug. 20, 2019

(54) METHOD FOR CHARGING BATTERY AND ELECTRONIC DEVICE THEREOF

(71) Applicant: Samsung Electronics Co., Ltd., Suwon-si, Gyeonggi-do (KR)

(72) Inventors: Ku-Chul Jung, Seoul (KR); Kisun Lee, Hwaseong-si (KR)

(73) Assignee: Samsung Electronics Co., Ltd., Seoul (KR)

( * ) Notice: Subject to any disclaimer, the term of this patent is extended or adjusted under 35 U.S.C. 154(b) by 440 days.

(21) Appl. No.: 14/288,008

(22) Filed: May 27, 2014

(65) Prior Publication Data
US 2014/0375280 A1 Dec. 25, 2014

(30) Foreign Application Priority Data
Jun. 25, 2013 (KR) ........................ 10-2013-0073088

(51) Int. Cl.
*H02J 7/00* (2006.01)
(52) U.S. Cl.
CPC ..... *H02J 7/0029* (2013.01); *H02J 2007/0037* (2013.01)
(58) Field of Classification Search
CPC .... H02J 7/0029; H02J 2007/0037; H02J 7/00; H02J 7/0081; H02J 7/0078; H02J 7/0052; H02J 7/06
USPC ....................................... 320/134, 163, 164
See application file for complete search history.

(56) References Cited

U.S. PATENT DOCUMENTS

| | | | | |
|---|---|---|---|---|
| 6,734,652 | B1 * | 5/2004 | Smith .................. | H02J 7/0029 320/163 |
| 7,764,050 | B2 * | 7/2010 | Xing ...................... | H02J 7/022 320/137 |
| 2004/0164709 | A1 * | 8/2004 | Kapsokavathis ..... | H02J 7/1461 320/132 |
| 2005/0127869 | A1 * | 6/2005 | Calhoon ................. | G06F 1/26 320/108 |
| 2005/0198407 | A1 * | 9/2005 | Lee ........................ | G06F 1/266 710/15 |
| 2006/0215428 | A1 * | 9/2006 | Mok ....................... | H02M 3/07 363/59 |
| 2007/0024213 | A1 * | 2/2007 | Shteynberg ........ | H05B 33/0815 315/291 |
| 2008/0197801 | A1 * | 8/2008 | Manor ................... | H02J 7/0054 320/103 |

(Continued)

OTHER PUBLICATIONS

Julu Sin, et. al., "Investigation of Alternative Power Architectures for CPU Voltage Regulators", Nov. 22, 2008, pp. 1-188, Blacksburg, Virginia.

(Continued)

*Primary Examiner* — Richard Isla
*Assistant Examiner* — Dung V Bui
(74) *Attorney, Agent, or Firm* — Jefferson IP Law, LLP

(57) ABSTRACT

An apparatus and a method for charging a battery in an electronic device are provided. The method includes, when charging power of a first level is supplied from a charger, converting the charging power of the first level to a charging power of a second level before providing charging power to a charging circuit, providing the charging power of the second level to the charging circuit, wherein the charging power of the first level is greater than the charging power of the second level.

3 Claims, 14 Drawing Sheets

(56) References Cited

U.S. PATENT DOCUMENTS

2009/0033293 A1* 2/2009 Xing ..................... H02J 7/0077
320/164
2010/0181968 A1* 7/2010 Kuo ..................... H02J 7/0031
320/163

OTHER PUBLICATIONS

Korean Office Action dated May 23, 2019, issued in the Korean Application No. 10-2013-0073088.

* cited by examiner

METHOD FOR CHARGING BATTERY AND ELECTRONIC DEVICE THEREOF

CROSS-REFERENCE TO RELATED APPLICATION(S)

This application claims the benefit under 35 U.S.C. § 119(a) of a Korean patent application filed on Jun. 25, 2013 in the Korean Intellectual Property Office and assigned Serial number 10-2013-0073088, the entire disclosure of which is hereby incorporated by reference.

TECHNICAL FIELD

The present disclosure relates to a method for charging a battery and an electronic device thereof More particularly, the present disclosure relates to an apparatus and a method for improving a battery charging performance of an electronic device.

BACKGROUND

Recently, as an electronic device develops rapidly, an electronic device that may exchange information or data is variously used.

The electronic device uses a rechargeable battery as a power supply to provide an advantage of mobility.

The capacity of the battery is limited, and a user should properly charge the battery before the remnant of the battery is exhausted completely.

Generally, a Travel Adapter (TA) that enables charging of the battery may convert power supplied from AC 110~220V which is a power source for home use, or another power supply source (for example: a computer) to Direct Current (DC) power used for charging the battery and provide the same to the electronic device, and the electronic device may use the DC power converted by the charger in charging the battery.

Recently, to shorten a charging time of the battery, a method for increasing a charging current is used.

In this case, however, a power loss may be generated by a circuit element forming a charger.

In addition, when using a charger whose charging voltage has been raised, a power loss generated inside the charger may be addressed, but power may be lost inside a charging circuit of the electronic device. For example, charging power of a high voltage provided from the charger may be lost by circuit elements forming the charging circuit of the electronic device.

Therefore, a need exists for an apparatus and a method for improving a battery charging performance of an electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for improving a battery charging performance of an electronic device.

Another aspect of the present disclosure is to provide an apparatus and a method for preventing high voltage charging power from being lost in a charging circuit.

Another aspect of the present disclosure is to provide an apparatus and a method for improving a battery charging performance using a switched capacitor.

Another aspect of the present disclosure is to provide an apparatus and a method for providing an overvoltage prevention function or an On-The-Go (OTG) power supply function using a switched capacitor.

In accordance with an aspect of the present disclosure, a method for charging a battery of an electronic device is provided. The method includes when charging power of a first level is supplied from a charger, converting the charging power of the first level to a charging power of a second level before providing charging power to a charging circuit, and providing the charging power of the second level to the charging circuit, wherein the charging power of the first level is greater than the charging power of the second level.

In accordance with another aspect of the present disclosure, a charging apparatus for battery charging is provided. The apparatus includes a switched capacitor configured to, when charging power of a first level is supplied from a charger, convert the charging power of the first level to a charging power of a second level before providing charging power to a charging circuit, and the charging circuit configured to charge a battery using the charging power of the second level converted by the switched capacitor.

In accordance with another aspect of the present disclosure, a computer-readable storage medium is provided. The computer-readable storage medium includes a program for executing, when charging power of a first level is supplied from a charger, an operation for converting the charging power of the first level to a charging power of a second level before providing charging power to a charging circuit, and an operation for providing the charging power of the second level to the charging circuit.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
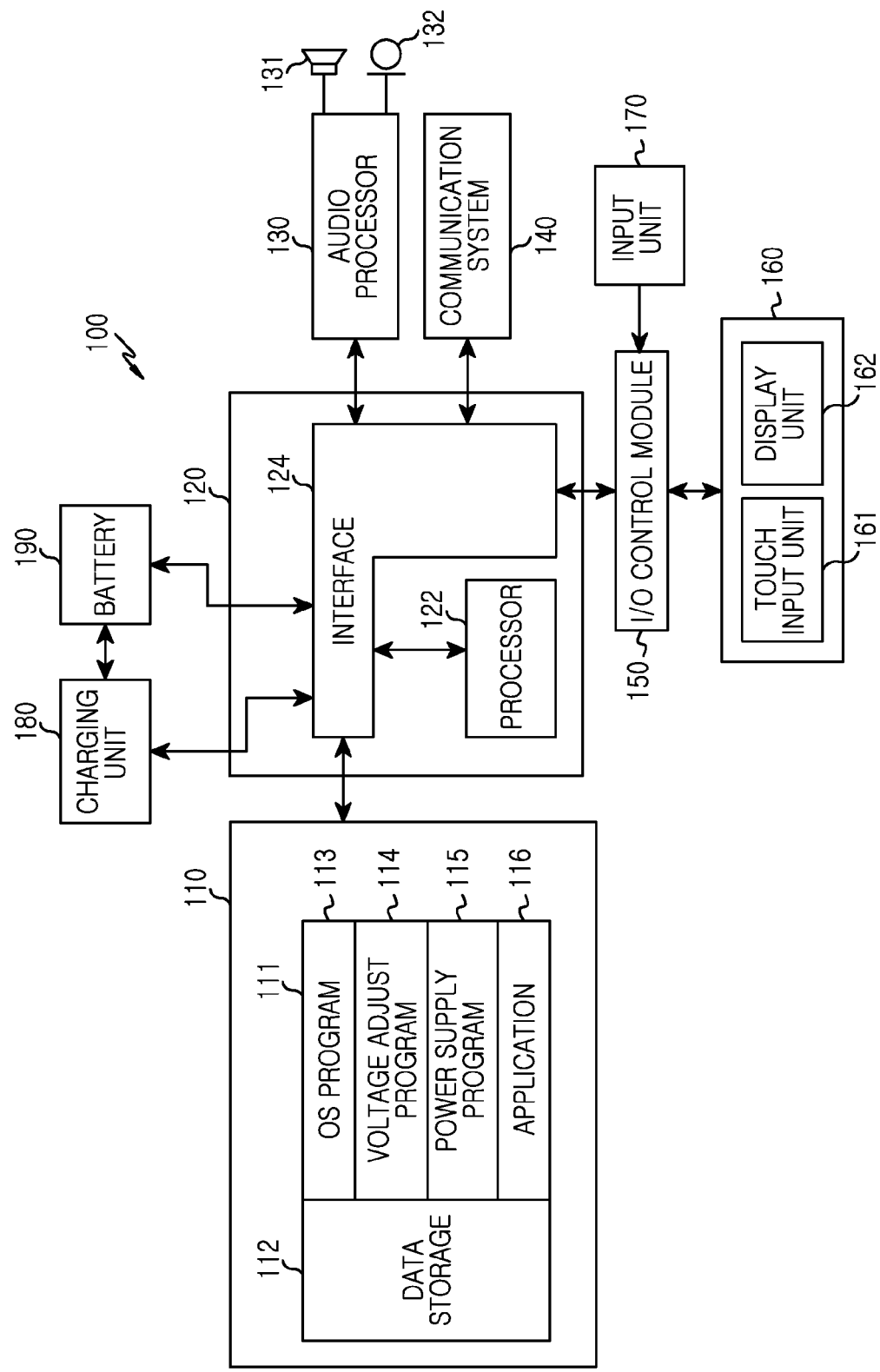
FIG. 1 is a block diagram illustrating an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Recently, as an electronic device develops rapidly, an electronic device that may exchange information or data is variously used, and to provide an advantage of mobility, an electronic device that uses a rechargeable battery is being brought to the market.

A charger for charging the battery may convert power supplied from AC 110~220V which is a power source for home use, or a computer to DC power used for charging the battery and provide the same to the electronic device, and the electronic device may use the DC power converted by the charger in charging the battery.

When using a charger that supplies a large charging current, rapid charging that shortens a battery charging time may be possible.

However, when increasing a charging current, power may be lost inside the charger. For example, a voltage drop in each circuit element by the characteristic of circuit elements forming the charger and heat by the voltage drop may occur, and a power loss may be generated for this reason and sufficient power may not be transferred to a charging circuit.

In addition, when using a charger whose charging voltage has been raised, a power loss generated inside the charger may be addressed, but power may be lost inside the charging circuit of the electronic device. For example, power provided from the charger may be lost by circuit elements forming the charging circuit of the electronic device.

In addition, heat may be generated to the electronic device, and the function of the electronic device that uses charging power of the charging circuit cannot be used. For example, a torch mode of the electronic device may use the power of the charging circuit during a battery charging operation. However, the torch mode cannot be performed due to a power loss generated inside the charging circuit.

When using a charger whose charging voltage has been raised, the electronic device may prevent power from being lost inside the charging circuit.

The electronic device may drop down the voltage of charging power provided from the charger and allows the dropped voltage to be input to the charging circuit to prevent power from being lost inside the charging circuit.

The electronic device may drop down the voltage of the charging power provided from the charger using a switched capacitor.

In addition, the electronic device may perform a function of charging a battery and using the power of the charging circuit simultaneously by preventing a power loss generated inside the charging circuit.

In addition, when detecting overvoltage charging power, the electronic device may block a power supply path for the charging circuit using the switched capacitor.

In addition, when detecting an On-The-Go (OTG) device is connected, the electronic device may form a power supply path for the OTG device using the switched capacitor.

In addition, the electronic device may be a portable electronic device, and may be a device, such as a portable terminal, a mobile terminal, a media player, a tablet computer, a handheld computer, a Personal Digital Assistant (PDA), and the like. In addition, the electronic device may be an arbitrary portable electronic device including a device that combines two or more functions among these devices. According to another embodiment of the present disclosure, the electronic device may include any kind of electronic device that may use external power. For example, the electronic device may include a video game console, a digital camera, a Mobile Internet Device (MID), an Ultra Mobile Personal Computer (UMPC), a navigation system, a digital clock, a Motion Pictures Expert Group (MPEG-1 or MPEG-2) Audio Layer 3 (MP3) player, and the like.

FIG. 1 is a block diagram illustrating an electronic device according to an embodiment of the present disclosure.

Referring to FIG. 1, an electronic device 100 may include a memory 110, a processor unit 120, an audio processor 130, a communication system 140, an Input/Output (I/O) control module 150, a touchscreen 160, an input unit 170, a charging unit 180, a battery 190, and the like. Here, one or more of the above-mentioned elements may be provided in a plurality. For example, the electronic device may include a plurality of memories 110 and a plurality of communication systems 140. Each element is described below.

The memory 110 may include a program storage 111 for storing a program for controlling an operation of the electronic device 100, or a data storage 112 for storing data occurring during execution of a program. For example, the data storage 112 may store various updatable data for storage, such as a phonebook, calling messages, received messages, and the like.

The program storage 111 may include an Operating System (OS) program 113, a voltage adjust program 114, a power supply program 115, or at least one application 116. Here, a program stored in the program storage 111 is a set of instructions and may be expressed as an instruction set.

The OS program 113 may include various software elements for controlling a general system operation. A control of this general system operation, for example, may denote memory management and control, storage hardware (device) control and management, power control and management, and the like. This OS program 113 may perform a function for swift communication between various hardwares (devices) and program elements (modules).

The voltage adjust program 114 may include at least one software element for processing to convert first DC power provided from a charger to second DC power.

The voltage adjust program 114 may process to convert an input voltage of a charging Integrated Circuit (IC) in order to raise charging efficiency.

To prevent the power of high voltage charging power from being lost by a circuit element forming a charging circuit, the voltage adjust program 114 may convert the charging power to low voltage charging power.

In addition, when detecting overvoltage charging power, the voltage adjust program 114 may block the charging power supplied to the charging circuit.

The voltage adjust program 114 may control the operations of a first switch, a second switch, a third switch, and a fourth switch configured in the charging unit.

For example, the voltage adjust program 114 may process to control a switch of the charging unit to allow the charging unit to distribute the charging power and drop down the voltage of the charging power.

In addition, the voltage adjust program 114 may control a switch of the charging unit to block overvoltage charging power supplied to the charging circuit.

When an OTG device is connected, the power supply program 115 may include at least one software element for processing to allow power provided from the battery 190 to be provided to the connected OTG device.

The power supply program 115 may control the operations of the first switch, the second switch, the third switch, and the fourth switch configured in the charging unit.

For example, the power supply program 115 may control the switch of the charging unit to allow the charging unit to provide the power of the battery 190 to the OTG device.

The application 116 may include a software element for at least one application installed to the electronic device.

In addition, a program included in the program storage 111 may be expressed in a hardware configuration. For example, the electronic device may include an OS module, a voltage adjust module, and a power supply module.

The processor unit 120 may include at least one processor 122 or an interface 124. Here, the processor 122 or the interface 124 may be integrated in at least one integrated circuit or implemented as a separate element.

The interface 124 may perform a role of a memory interface controlling an access of the processor 122 and the memory 110.

In addition, the interface 124 may perform a role of a peripheral interface for controlling connection between an I/O peripheral of the electronic device 100 and the processor 122.

To prevent the power of high voltage charging power from being lost due to a circuit element forming a charging circuit, the processor 122 may convert the high voltage charging power to low voltage charging power, and when detecting overvoltage charging power, the processor 122 may block the overvoltage charging power supplied to the charging circuit using at least one software program.

In addition, when an OTG device is connected, the processor 122 may control power provided from the battery 190 to be provided to the connected OTG device using at least one software program.

At this point, the processor 122 may include a processor for controlling to execute at least one program stored in the memory 110 and perform a function corresponding to the relevant program. In this case, the processor 122 may be configured as in FIGS. 3, 4, and 5.

The audio processor 130 may provide an audio interface between a user and the electronic device 100 via a speaker 131 or a microphone 132.

The communication system 140 may perform a communication function for voice communication or data communication of the electronic device 100. At this point, the communication system 140 may be divided into a plurality of communication submodules supporting different communication networks. For example, though not limited thereto, the communication network may include a Global System for Mobile Communication (GSM) network, an Enhanced Data GSM Environment (EDGE) network, a Code Division Multiple Access (CDMA) network, a Wide-CDMA (W-CDMA) network, a Long Term Evolution (LTE) network, an Orthogonal Frequency Division Multiple Access (OFDMA) network, a wireless LAN, a Bluetooth network, a Near Field Communication, and the like.

The I/O control module 150 may provide an interface between an I/O unit, such as the touchscreen 160 or the input unit 170, the interface 124, and the like.

The touchscreen 160 is an I/O unit for performing display of information or input of information, and may include a touch input unit 161 and a display unit 162.

The touch input unit 161 may provide touch information detected via a touch panel to the processor unit 120 via the I/O control module 150. At this point, the touch input unit 161 may change touch information to an instruction structure, such as a touch_down, a touch_move, a touch_up, and the like, and provide the same to the processor unit 120.

The display unit 162 may display state information of the electronic device 100, a character input by a user, a moving picture or a still picture, and the like.

The input unit 170 may provide input data generated by the user's selection to the processor unit 120 via the I/O control module 150. For example, the input unit 170 may include a control button for controlling the electronic device 100.

The charging unit 180 may connect with a charger supplying external power to charge the battery 190 using charging power provided from the charger.

The charging unit 180 may connect with a wired or wireless charger having various rated capacities. The charging unit 180 may include a charging circuit, and generate a charging current for charging the battery 190 using charging power provided from the charger.

To prevent the power of high voltage charging power from being lost by a circuit element forming a charging circuit, the charging unit 180 may convert the charging power to low voltage charging power to provide the same to the charging circuit, and when overvoltage charging power is detected, the charging unit 180 may block the charging power supplied to the charging circuit.

In addition, when an OTG device is connected, the charging unit 180 may control power provided from the battery 190 to be provided to the connected OTG device.

The battery 190 is charged by a current provided from the charging circuit, and may provide power for the operation of the electronic device.

Though not shown, the electronic device 100 may further include elements for providing additional functions, such as a broadcast reception module for receiving broadcasting, a digital sound source reproduction module, such as an MP3 module, a short distance wireless communication module for short distance wireless communication, an image sensor for obtaining image data, a proximity sensor module for proximity detection, and the like, and softwares for operations of these.

Figure 2:
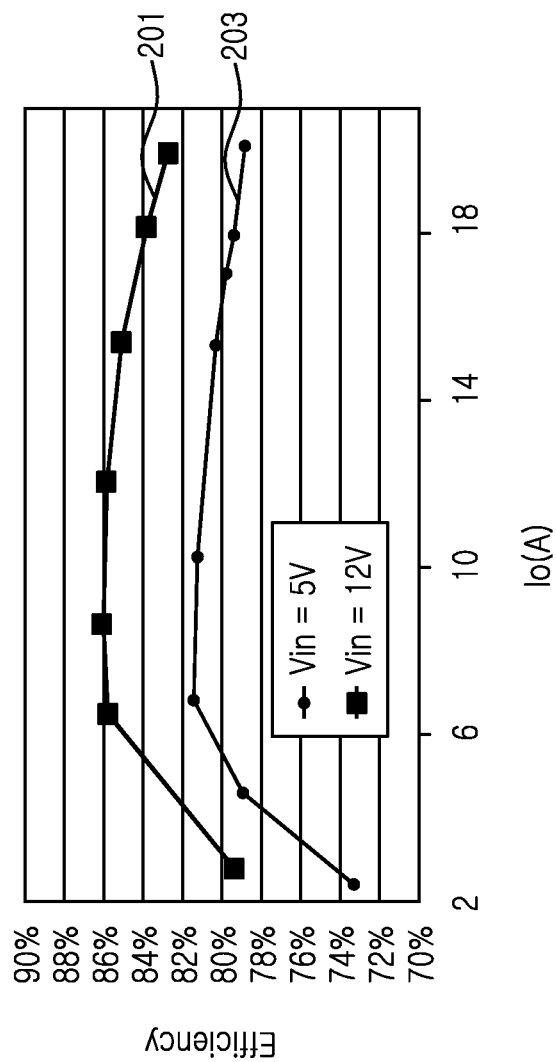
FIG. 2 is a graph illustrating a charging efficiency depending on an input voltage of a charging circuit according to an embodiment of the present disclosure.

FIG. 2 is a graph illustrating a charging efficiency depending on an input voltage of a charging circuit according to an embodiment of the present disclosure.

When using a charger whose charging voltage has been raised, an electronic device may prevent power from being lost in a charging circuit.

Referring to FIG. 2, it illustrates charging efficiency of a circumstance where charging power 201 of 5V and charging power 203 of 12V are input to the charging circuit.

Examination of the graph shows that charging efficiency increases by about 8% when charging power 201 of 5V is supplied to the charging circuit rather than when charging power 203 of 12V is input.

Therefore, the electronic device may lower the voltage of the charging power input to the charging circuit to increase charging efficiency.

For example, the electronic device may receive the charging power of 12V from the charger. In this case, the electronic device may lower the charging power input from the charger to 6V, and then process to allow the charging power to be input to the charging circuit.

Figure 3:
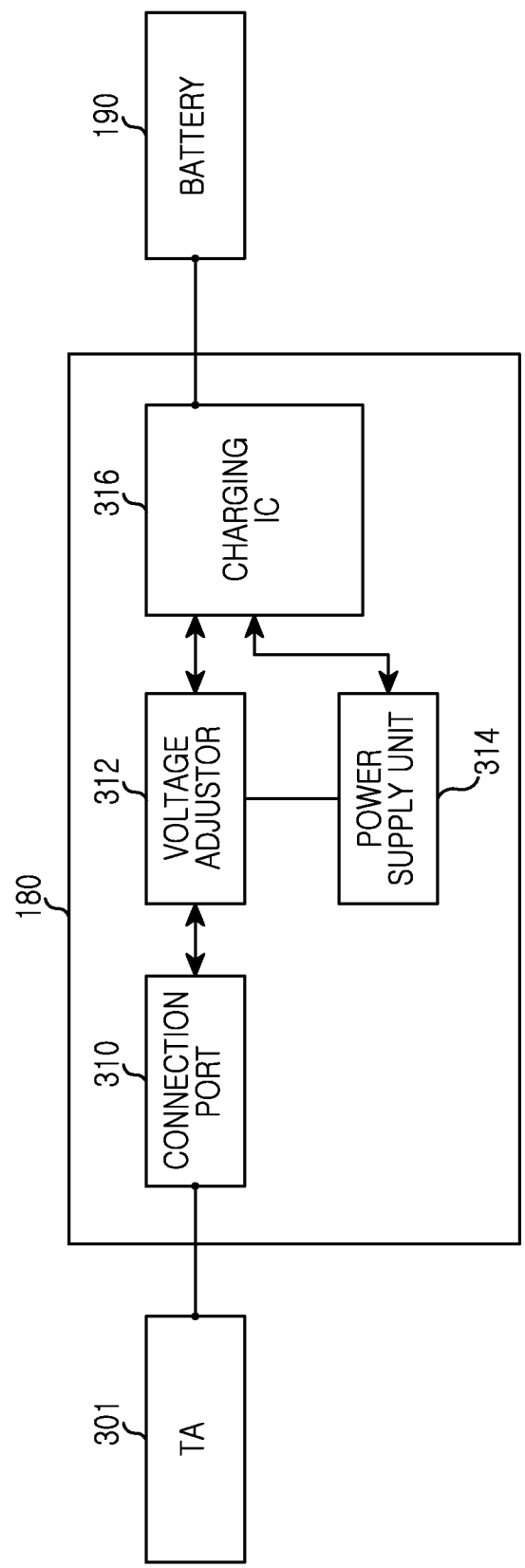
FIG. 3 is a block diagram illustrating a charging unit according to an embodiment of the present disclosure.

FIG. 3 is a block diagram illustrating a charging unit according to an embodiment of the present disclosure.

Referring to FIG. 3, the charging unit 180 may include a connection port 310, a voltage adjustor 312, a power supply unit 314, and a charging circuit (charging Integrated Circuit (IC)) 316.

The connection port 310 is connected with a charger 301 for supplying external power, and may provide charging power provided from the charger 301 to the voltage adjustor 312.

The electronic device may connect with the charger 301 having various rated capacities via the connection port 310. Here, the charger 301 having various rated capacities may include a charger having a high charging voltage and a charger not having the high charging voltage.

In addition, the electronic device may connect with the charger 301 enabling wired or wireless charging via the connection port 310.

The voltage adjustor 312 may drop down the voltage of charging power provided from the charger 301 connected to the connection port 310 to provide the same to the charging circuit 316.

For example, to prevent the power of high voltage charging power from being lost by a circuit element forming the charging circuit 316, the voltage adjustor 312 may convert the high voltage charging power to low voltage charging power to provide the same to the charging circuit 316.

According to an embodiment of the present disclosure, the voltage adjustor 312 may divide an input charging voltage, and include a switched capacitor enabling current balance.

In this case, the voltage adjustor 312 may include a first switch, a second switch, a third switch, and a fourth switch connected in series, a first capacitor connected in parallel with the second switch and the third switch, and a second capacitor connected in parallel with the third switch and the fourth switch.

The voltage adjustor 312 may operate the first switch and the third switch to perform a first mode such that a voltage is divided to the first capacitor and the second capacitor. In addition, the voltage adjustor 312 may operate the second switch and the fourth switch to perform a second mode that performs a current balance operation for the first capacitor and the second capacitor.

When receiving charging power from the charger 301, the voltage adjustor 312 may perform the operations of the first mode and the second mode in turns to allow a divided voltage to be input to the charging circuit 316 during the first mode, and allow a divided voltage charged in the capacitor to be input to the charging circuit 316 during the second mode.

Assuming a circumstance where the voltage adjustor 312 is connected with the charger 301 providing charging power of 12V, the voltage adjustor 312 may perform the operations of the first mode and the second mode to convert the charging power of 12V to charging power of 6V and allow the charging power of 6V to be input to the charging circuit 316.

In addition, when overvoltage charging power is input from the charger 301, the voltage adjustor 312 may process to control the switch to block a power supply path.

For example, the voltage adjustor 312 may include a circuit element (for example, a zener diode, and the like) for removing a surge voltage, and block a power supply path for the charging circuit 316 using the element and the switch. For example, when overvoltage charging power is provided from the charger 301, supplying of the charging power to the charging circuit 316 may be blocked, and the charging power may be provided to the element for removing the surge voltage.

In summary, the voltage adjustor 312 may control a power supply path provided from the charger 301 or the battery 190.

The voltage adjustor 312 may include various devices selectively enabling voltage division besides a switched capacitor.

The charging circuit 316 may process to provide a charging current for charging to the battery 190 using charging power provided from the charger 301, so that the battery 190 is charged. For example, the battery 190 is charged by a current provided from the charging circuit 316, and may supply power for the operation of the electronic device.

The power supply unit 314 may process to allow power to be supplied to an OTG device using the power of the battery 190.

For example, when the OTG device is connected, the power supply unit 314 may control a switch of the voltage adjustor 312 to allow the power of the battery 190 to be provided to the OTG device.

Figure 4:
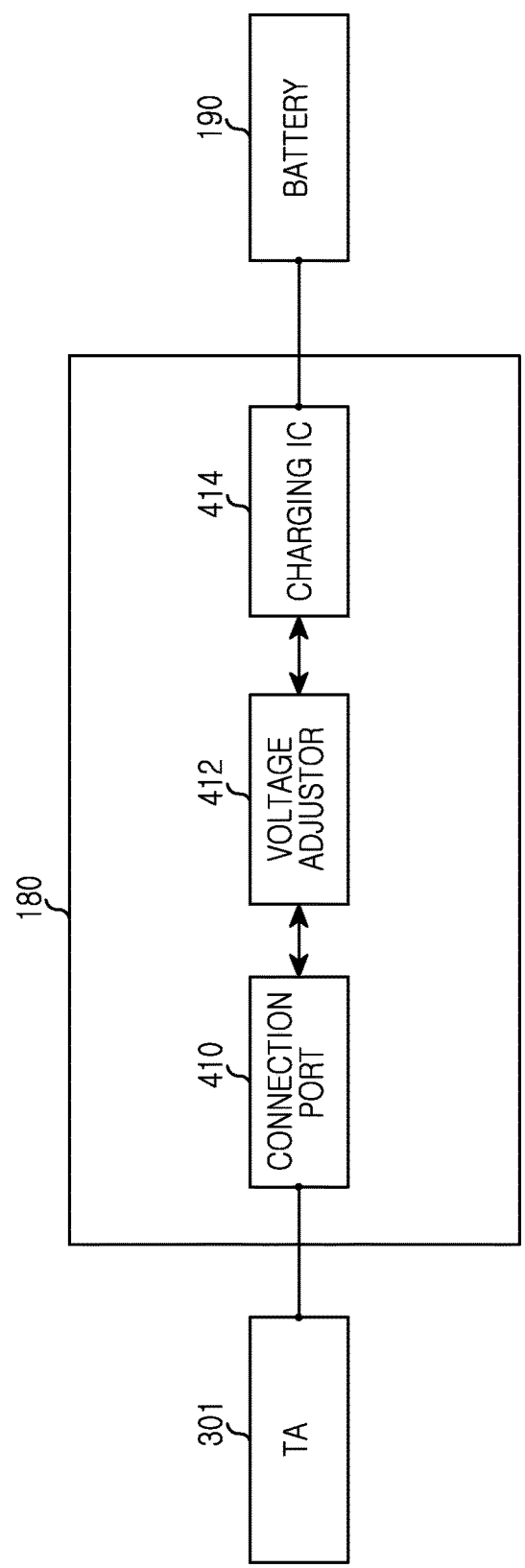
FIG. 4 is a block diagram illustrating a charging unit according to an embodiment of the present disclosure.

FIG. 4 is a block diagram illustrating a charging unit according to an embodiment of the present disclosure.

Referring to FIG. 4, the charging unit 180 may include a connection port 410, a voltage adjustor 412, and a charging circuit 414.

The connection port 410 is connected with the charger 301 supplying external power, and may provide charging power provided from the charger 301 to the voltage adjustor 412.

The electronic device may connect with the wired or wireless charger 301 having various rated capacities via the connection port 410. Here, the charger 301 having various rated capacities may include a charger having a high charging voltage and a charger not having the high charging voltage.

The voltage adjustor 412 may drop down the voltage of charging power provided from the charger 301 connected to the connection port 410 to provide the same to the charging circuit 414.

For example, to prevent the power of high voltage charging power from being lost by a circuit element forming the charging circuit 414, the voltage adjustor 412 may convert the high voltage charging power to low voltage charging power to provide the same to the charging circuit 414.

According to an embodiment of the present disclosure, the voltage adjustor 412 may divide an input voltage, and use a switched capacitor enabling a current balance.

In this case, the voltage adjustor 412 may include a first switch, a second switch, a third switch, and a fourth switch connected in series, a first capacitor connected in parallel with the second switch and the third switch, and a second capacitor connected in parallel with the third switch and the fourth switch.

The voltage adjustor 412 may operate the first switch and the third switch to perform a first mode such that a voltage is divided to the first capacitor and the second capacitor. In addition, the voltage adjustor 412 may operate the second switch and the fourth switch to perform a second mode that performs a current balance operation for the first capacitor and the second capacitor.

When receiving charging power from the charger 301, the voltage adjustor 412 may perform the operations of the first mode and the second mode in turns to allow a divided voltage to be input to the charging circuit 414 during the first mode, and allow a divided voltage charged in the capacitor to be input to the charging circuit 414 during the second mode.

Assuming a circumstance where the voltage adjustor 412 is connected with the charger 301 providing charging power of 12V, the voltage adjustor 412 may perform the operations of the first mode and the second mode to convert the charging power of 12V to charging power of 6V and allow the charging power of 6V to be input to the charging circuit 414.

In addition, when overvoltage charging power is input from the charger 301, the voltage adjustor 412 may process to control the switch to block a power supply path.

For example, the voltage adjustor 412 may include a circuit element (for example, a zener diode, and the like) for removing a surge voltage, and block a power supply path for the charging circuit 414 using the element and the switch. For example, when overvoltage charging power is provided from the charger 301, supplying of the charging power to the charging circuit 414 may be blocked, and the charging power may be provided to the element for removing the surge voltage.

The charging circuit 414 may process to provide a charging current for charging to the battery 190 using charging power provided from the charger 301, so that the battery 190 is charged. For example, the battery 190 is charged by a current provided from the charging circuit 414, and may supply power for the operation of the electronic device.

For example, to raise charging efficiency, the charging unit 180 may be configured to have a function for dropping down charging power and blocking overvoltage charging power supplied to the charging circuit 414.

Figure 5:
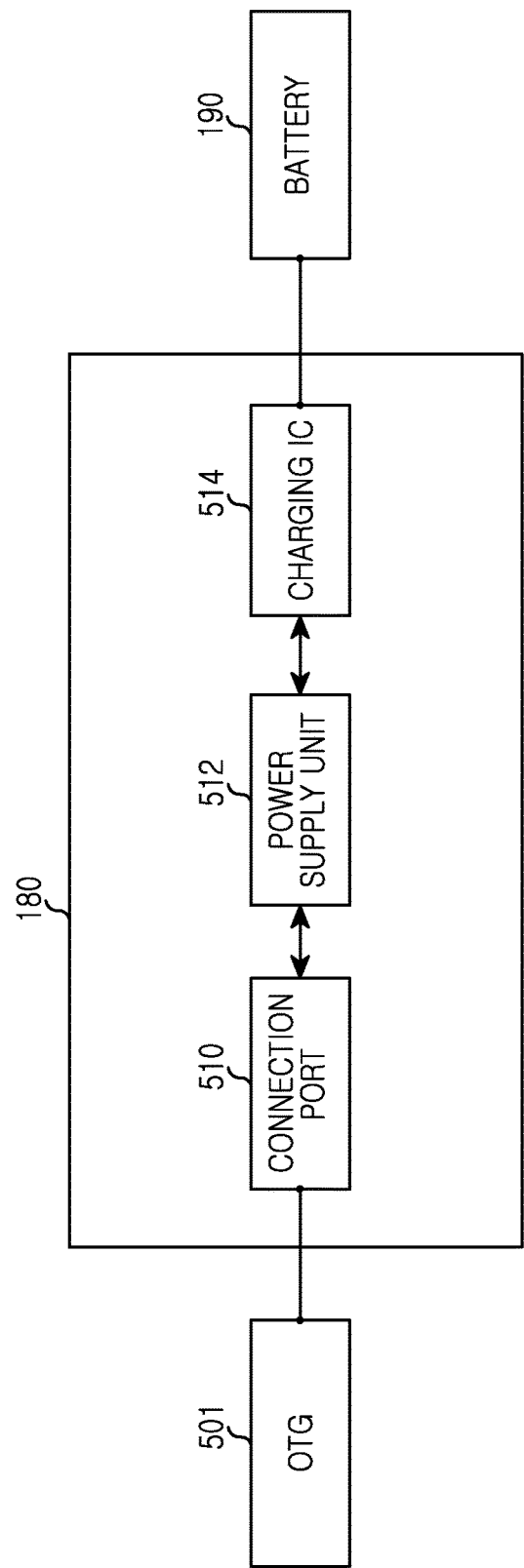
FIG. 5 is a block diagram illustrating a charging unit according to an embodiment of the present disclosure.

FIG. 5 is a block diagram illustrating a charging unit according to an embodiment of the present disclosure.

Referring to FIG. 5, the charging unit 180 may include a connection port 510, a power supply unit 512, and a charging circuit 514.

The connection port 510 is connected to an OTG device 501, and may provide power provided from the battery 190 to the OTG device 501.

The power supply unit 512 may process to allow power to be supplied to the OTG device 501 using the power of the battery 190.

The power supply unit 512 may control a power supply path for the charging unit 180 using a switched capacitor.

For example, the power supply unit 512 may control a power supply path allowing charging power provided from the charger 301 connected to the connection port 510 to be provided to the charging circuit.

In addition, the power supply unit 512 may control to allow power provided from the battery 190 to be provided to the OTG device 501 connected to the connection port 510.

In this case, the power supply unit 512 may include a first switch, a second switch, a third switch, and a fourth switch connected in series, a first capacitor connected in parallel with the second switch and the third switch, and a second capacitor connected in parallel with the third switch and the fourth switch.

The power supply unit 512 may operate the first switch and the third switch to perform a first mode such that a voltage is divided to the first capacitor and the second capacitor. In addition, the power supply unit 512 may operate the second switch and the fourth switch to perform a second mode that performs a current balance operation for the first capacitor and the second capacitor.

In addition, the power supply unit 512 may operate the first switch and the second switch to perform a third mode so that a power supply path from the battery 190 to the connection port 510 may be formed.

For example, when the charger 301 is connected to the connection port 510, the power supply unit 512 may form a power supply path that allows charging power to be provided to the charging circuit 514, and when the OTG device 501 is connected to the connection port 510, the power supply unit 512 may form a power supply path that allows charging power to be provided to the OTG device 501.

Figure 6A:
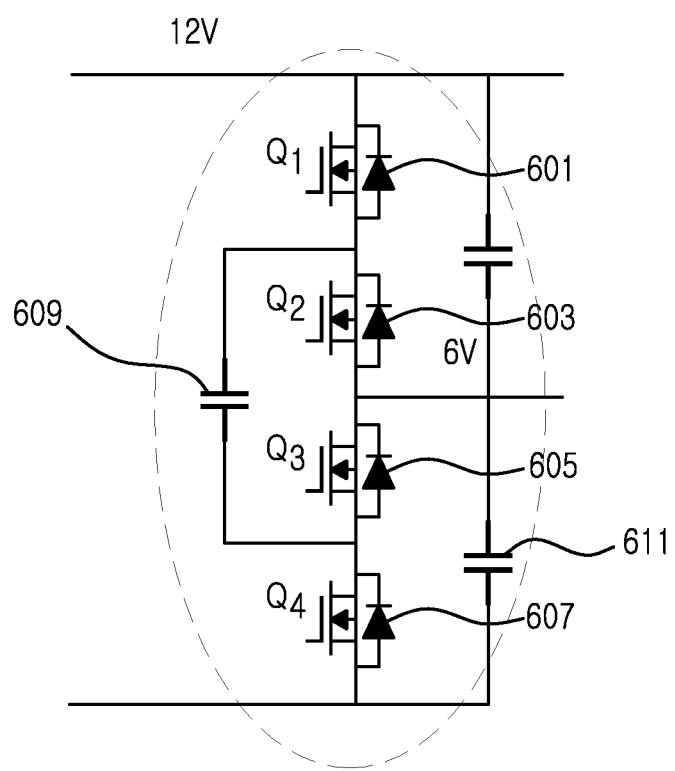
FIGS. 6A and 6B illustrate a voltage adjuster according to an embodiment of the present disclosure.
Figure 6B:
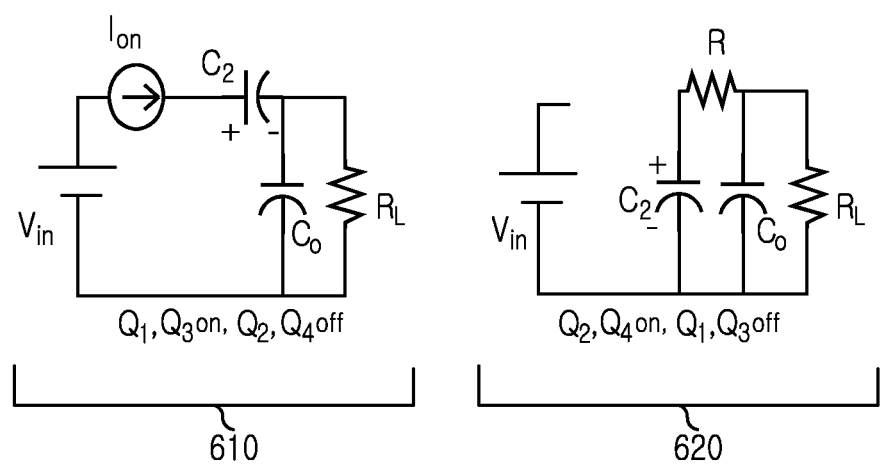

FIGS. 6A and 6B illustrate a voltage adjuster according to an embodiment of the present disclosure.

Referring to FIGS. 6A and 6B, to prevent power of high voltage charging power from being lost by a circuit element forming a charging circuit, the voltage adjustor may convert the charging power to low voltage charging power and provide the same to the charging circuit.

This voltage adjustor may drop down an input voltage provided from a charger using a switched capacitor.

In this case, as illustrated in FIG. 6A, the voltage adjustor may include a first switch Q1 601, a second switch Q2 603, a third switch Q3 605, and a fourth switch Q4 607 connected in series, and include a first capacitor 609 connected in parallel with the second switch Q2 603 and the third switch Q3 605 and a second capacitor 611 connected in parallel with the third switch Q3 605 and the fourth switch Q4 607.

The voltage adjustor may control the switch to perform the operations for the first mode and the second mode.

The voltage adjustor may perform the first mode by operating the first switch Q1 601 and the third switch Q3 605. While operating in the first mode, the voltage adjustor becomes a circuit 610 illustrated in FIG. 6B to allow a voltage to be divided to the first capacitor 609 and the second capacitor 611. For example, during an operation of the first mode with charging power of 12V supplied, charging power of 6V may be supplied to each capacitor.

The voltage adjustor may perform the second mode by operating the second switch Q2 603 and the fourth switch Q4 607. While operating in the second mode, the voltage adjustor becomes a circuit 620 illustrated in FIG. 6B to perform a current balance operation for the first capacitor 609 and the second capacitor 611.

For example, when receiving charging power from the charger, the voltage adjustor may perform the operations of the first mode and the second mode in turns to allow a divided voltage to be input to the charging circuit during the first mode, and allow a divided voltage charged in the capacitor to be input to the charging circuit.

Figure 7:
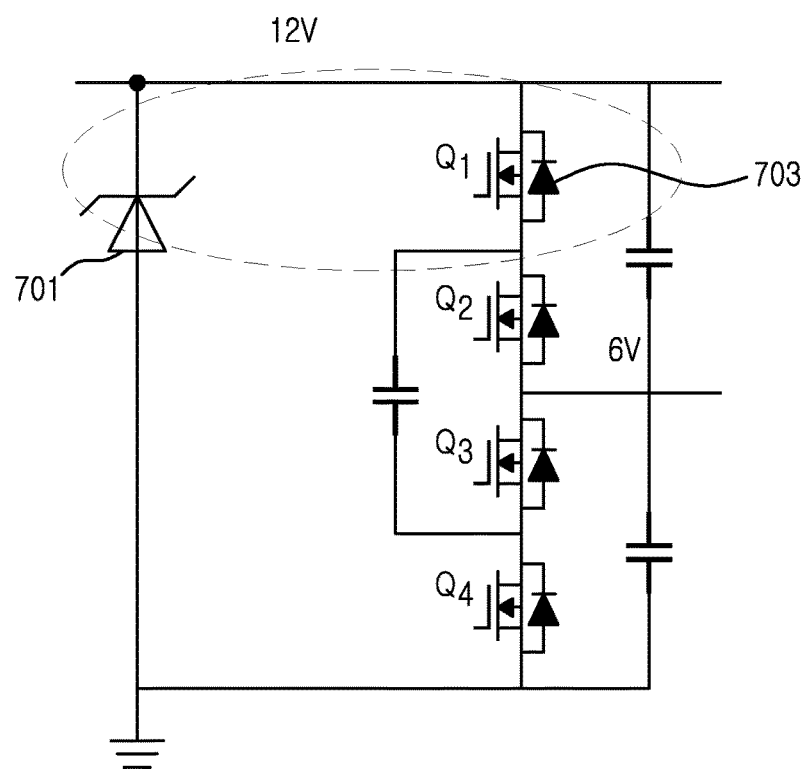
FIG. 7 illustrates a voltage adjustor according to an embodiment of the present disclosure.

FIG. 7 illustrates a voltage adjustor according to an embodiment of the present disclosure.

Referring to FIG. 7, to prevent power of high voltage charging power from being lost by a circuit element forming a charging circuit, the voltage adjustor may convert the charging power to low voltage charging power and provide the same to the charging circuit.

In addition, when overvoltage charging power is detected, the voltage adjustor may process to block the charging power supplied to the charging circuit.

In this case, as illustrated, the voltage adjustor may include a first switch, a second switch, a third switch, and a fourth switch connected in series, a first capacitor connected in parallel with the second switch and the third switch, and a second capacitor connected in parallel with the third switch and the fourth switch. In addition, the voltage adjustor may include a circuit element 701 (for example, a zener diode, and the like) for removing a surge voltage.

The voltage adjustor may drop down the voltage of charging power provided from the charger as described with reference to FIG. 6.

In addition, when overvoltage charging power is detected, the voltage adjustor controls (turns off) the operation of the first switch Q1 703 to process to allow the charging power not to be provided to the charging circuit but to be provided to the element 701 for removing the surge voltage.

Figure 8:
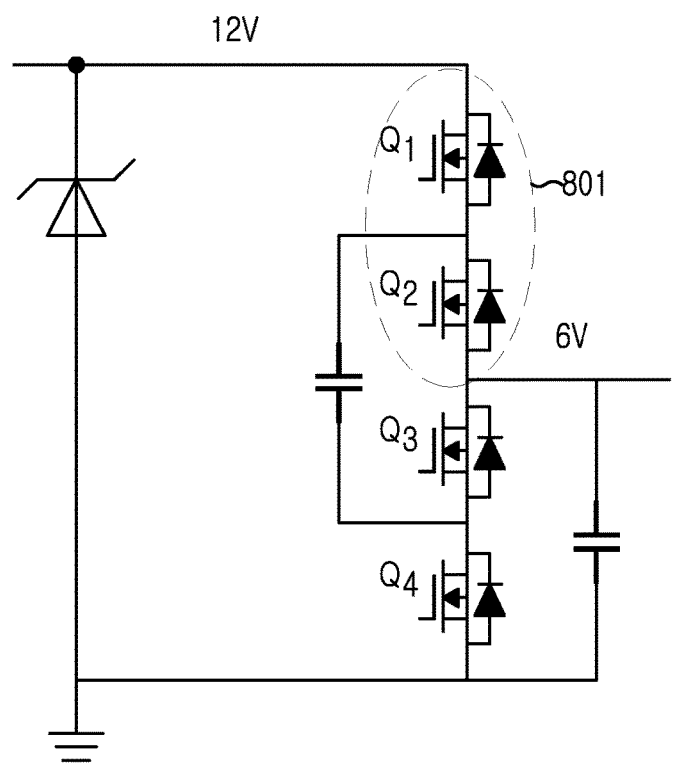
FIG. 8 illustrates a power supply unit according to an embodiment of the present disclosure.

FIG. 8 illustrates a power supply unit according to an embodiment of the present disclosure.

Referring to FIG. 8, the power supply unit may control a power supply path for a charging unit.

For example, the power supply unit may control a power supply path that allows charging power provided from the charger connected to the connection port to be provided to the charging circuit.

In addition, the power supply unit may control to allow power provided from the battery to be provided to an OTG device connected to the connection port.

In this case, the power supply unit may include a first switch, a second switch, a third switch, and a fourth switch connected in series, a first capacitor connected in parallel with the second switch and the third switch, and a second capacitor connected in parallel with the third switch and the fourth switch.

The power supply unit may operate the first switch and the third switch to perform a first mode such that a voltage is divided to the first capacitor and the second capacitor. In addition, the power supply unit may operate the second switch and the fourth switch to perform a second mode that performs a current balance operation for the first capacitor and the second capacitor.

In addition, the power supply unit may operate the first switch and the second switch 801 to perform a third mode so that a power supply path from the battery to the connection port may be formed.

For example, when the charger is connected to the connection port, the power supply unit may form a power supply path that allows charging power to be provided to the charging circuit, and when an OTG device is connected to the connection port, the power supply unit may form a power supply path that allows charging power to be provided to the OTG device.

Referring to the configuration of FIGS. 6A, 6B, 7, and 8, the voltage adjustor and the power supply unit equally include a switched capacitor. Therefore, the voltage adjustor may perform the operation of the power supply unit. In addition, the power supply unit may perform the operation of the voltage adjustor.

Figure 9:
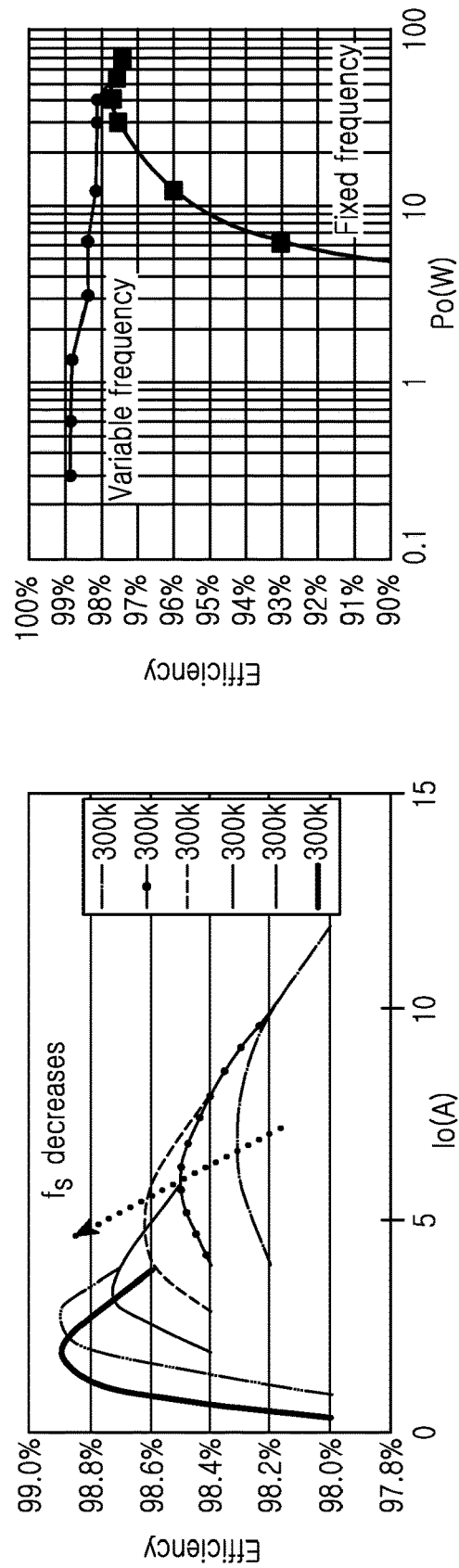
FIG. 9 is a graph illustrating a switching operation of a voltage adjuster according to an embodiment of the present disclosure.

FIG. 9 is a graph illustrating a switching operation of a voltage adjuster according to an embodiment of the present disclosure.

Referring to FIG. 9, the voltage adjustor may drop down an input voltage provided from a charger using a switched capacitor.

The voltage adjustor may control a plurality of switches to perform the operations for a first mode and a second mode. For example, the voltage adjustor may perform the first mode and the second mode in turns with an interval of a certain period.

The voltage adjustor may control a switching operation frequency to perform the operations of the first mode and the second mode.

Generally, the charging efficiency of the battery may be different every switching operation frequency. For example, as illustrated in the graph (the left graph), the charging efficiency of the battery may be good when a switching operation frequency is low rather than when the switching operation frequency is high.

However, the charging efficiency of the battery may have an influence on a load of the system.

For example, when the load of the system is small, the charging efficiency is good even when the switching operation frequency is high. In contrast, when the load of the system is big, the switching operation frequency should be low so that the charging efficiency may be good.

Therefore, the voltage adjustor according to the present disclosure may dynamically change the switching operation frequency depending on the load degree of the system.

For example, as illustrated in the graph (the right graph), it is known that the charging efficiency is good when using a dynamic switching operation frequency depending on the load of the system rather than using a fixed switching operation frequency.

According to an embodiment of the present disclosure, a charging apparatus for battery charging may include a switched capacitor for, when charging power of a first level is supplied from a charger, converting the charging power of the first level to charging power of a second level before providing the charging power to a charging circuit, and the charging circuit configured to charge a battery using the charging power of the second level converted by the switched capacitor.

According to an embodiment of the present disclosure, the switched capacitor may be configured to lower the voltage of the charging power of the first level to convert the charging power to charging power of the second level.

According to an embodiment of the present disclosure, the switched capacitor may be configured to include a first switch, a second switch, a third switch, and a fourth switch connected in series, and a first capacitor, and a second capacitor. The first capacitor may be connected in parallel with the second switch and the third switch. The second capacitor may be connected in parallel with the third switch and the fourth switch.

According to an embodiment of the present disclosure, the switched capacitor may be configured to perform a first mode where a voltage is divided to the first capacitor and the second capacitor, and a second mode that performs a current balance operation for the first capacitor and the second capacitor.

According to an embodiment of the present disclosure, the switched capacitor may be configured to change a switching operation frequency depending on a load amount of the charging apparatus and perform operations of the first mode and the second mode.

According to an embodiment of the present disclosure, the switched capacitor may be configured to operate the first switch and the third switch connected in series to operate in the first mode.

According to an embodiment of the present disclosure, the switched capacitor may be configured to operate the second switch and the fourth switch connected in series to operate in the second mode.

According to an embodiment of the present disclosure, the switched capacitor may be configured to include a circuit element for removing a surge voltage, and configured to block a power supply path using the circuit element and the switch when overvoltage charging power is supplied from the charger.

According to an embodiment of the present disclosure, the switched capacitor may be configured to turn off the first switch connected in series to block a power supply path.

According to an embodiment of the present disclosure, when power needs to be supplied to an external device, the switched capacitor may be configured to control the switch to form a power supply path between a battery and the external device.

According to an embodiment of the present disclosure, the switched capacitor may be configured to operate the first switch and the second switch connected in series to form a power supply path.

According to an embodiment of the present disclosure, the charging circuit may provide charging power of the second level to an operation module of the electronic device simultaneously with charging of the battery.

Figure 10:
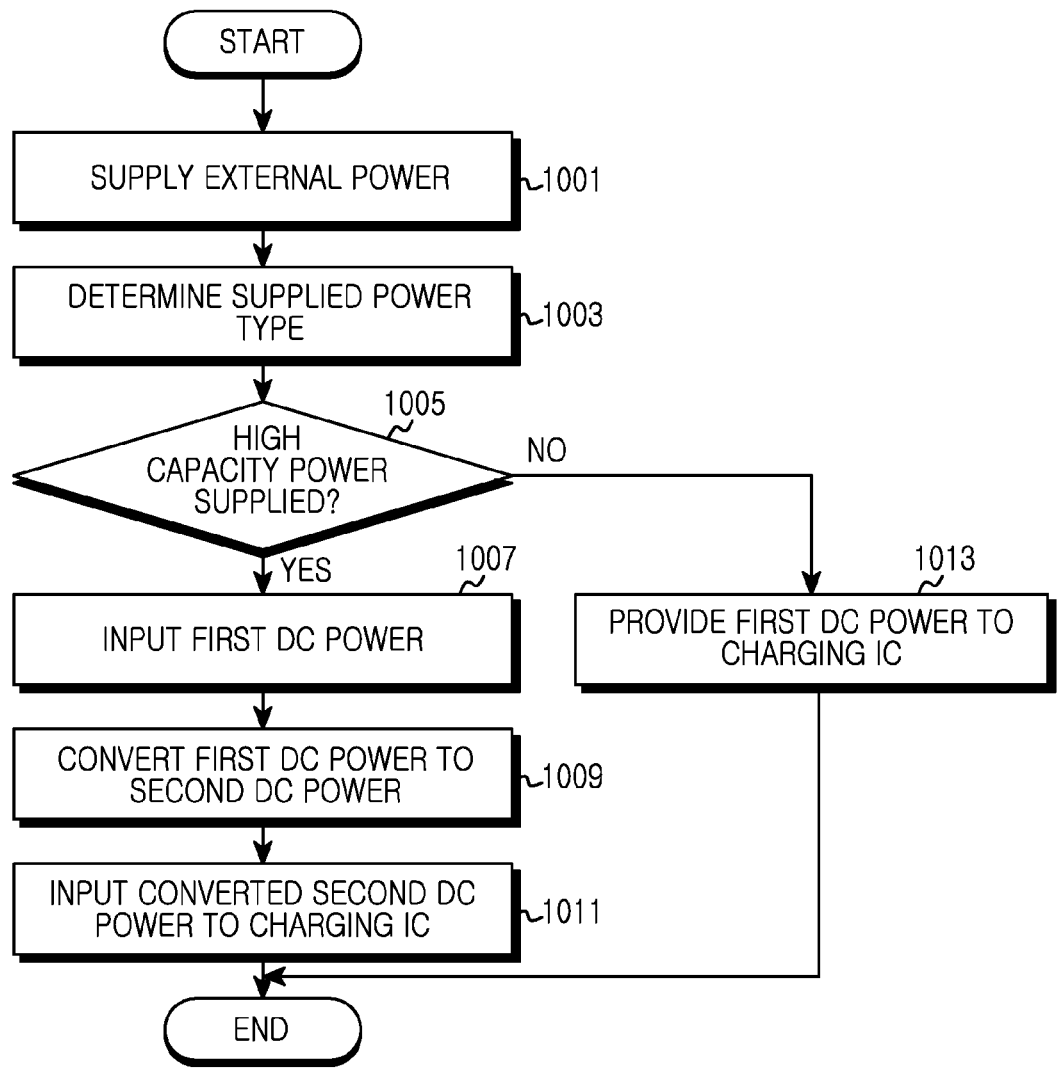
FIG. 10 is a flowchart illustrating a battery charging operation of a charging unit according to an embodiment of the present disclosure.

FIG. 10 is a flowchart illustrating a battery charging operation of a charging unit according to an embodiment of the present disclosure.

Referring to FIG. 10, the charging unit may include a switched capacitor, and drop down the voltage of charging power provided via a charger.

For example, the charging unit may include a first switch, a second switch, a third switch, and a fourth switch connected in series, a first capacitor connected in parallel with the second switch and the third switch, and a second capacitor connected in parallel with the third switch and the fourth switch.

The charging unit may perform the operations of a first mode and a second mode using the switched capacitor.

The first mode is a mode for dividing charging power supplied from the charger, and the second mode is a mode for performing a current balance operation for the divided charging power. The first mode and the second mode may be modes for dropping down the voltage of the charging power supplied from the charger.

The charging unit provides charging power whose voltage has been dropped down to the charging circuit to prevent power of high voltage charging power from being lost by a circuit element forming the charging circuit.

The charging unit for performing the above operation may receive external power in operation 1001. For example, the charging unit may be supplied with charging power via a wired or wireless charger.

The charging unit may determine the type of the supplied external power in operation 1003. Here, the charging unit may determine a rated capacity of the charger that supplies the external power.

The charging unit may determine whether the charger that supplies external power provides high voltage charging power or provides charging power whose voltage is not high in operation 1005. According to an embodiment of the present disclosure, the charging unit may be supplied with charging power of 12V or charging power of 6V from the charger. When receiving the charging power of 12V, the charging unit may determine that it receives high voltage charging power. In addition, the high voltage charging power denotes charging power that may cause a power loss by an element of the charging circuit.

When determining whether high voltage charging power is supplied from the charger, the charging unit may receive first DC power from the charger in operation 1007. This may be receiving charging power obtained by converting AC power to DC power from the charger. For example, the charging unit may be supplied with charging power of 12V from the charger.

The charging unit may convert the first DC power input from the charger to second DC power in operation 1009.

The charging unit may drop down the first DC power input from the charger to the second DC power so that power may not be lost by an element of the charging circuit. For example, the charging unit may drop down supplied charging power of 12V to charging power of 6V.

The charging unit may provide the dropped second DC power to the charging circuit so that power may not be lost by an element of the charging circuit in operation 1011.

In addition, when not receiving high voltage charging power from the charger, the charging unit may provide the first DC power input from the charger to the charging circuit in operation 1013. For example, the charging unit may be supplied with charging power of 6V from the charger and process to allow the charging power to be input to the charging circuit.

In summary, the high voltage charging power supplied from the charger may address a power loss that may occur in the charger, but the charging power may generate a power loss inside the charging circuit.

To address this issue, the charging unit according to the present disclosure drops down the high voltage charging power supplied from the charger to prevent a power loss from being generated to the charging circuit.

Figure 11:
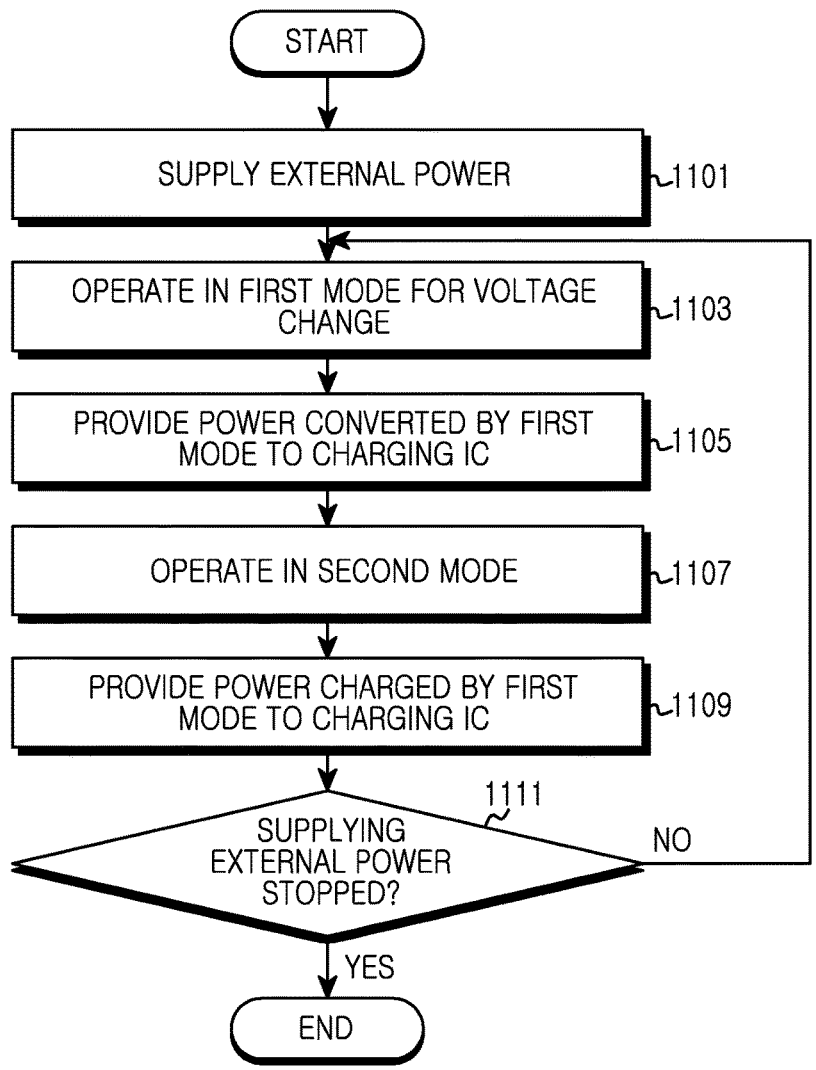
FIG. 11 is a flowchart illustrating a charging power supply operation of a charging unit according to an embodiment of the present disclosure.

FIG. 11 is a flowchart illustrating a charging power supply operation of a charging unit according to an embodiment of the present disclosure.

Referring to FIG. 11, the charging unit may include a switched capacitor and drop down the voltage of charging power provided from a charger.

For example, the charging unit may include a first switch, a second switch, a third switch, and a fourth switch, a first capacitor connected in parallel with the second switch and the third switch, and a second capacitor connected in parallel with the third switch and the fourth switch.

The charging unit may operate the first switch and the third switch to perform a first mode so that a voltage may be divided to the first capacitor and the second capacitor. In addition, the charging unit may operate the second switch and the fourth switch to perform a second mode that performs a current balance operation for the first capacitor and the second capacitor.

The charging unit may perform the first mode and the second mode in turns with an interval of a certain period.

The charging unit may receive charging power from the charger in operation 1101. The charging unit may be connected with a wired or wireless charger to receive high voltage charging power for battery charging. When the high voltage charging power is input to a charging circuit, a power loss may occur inside the charging circuit.

The charging unit may operate in the first mode for changing the voltage of the charging power provided from the charger in operation 1103. Here, the first mode is a mode for dividing a voltage with respect to input charging power.

The charging unit may provide the charging power converted by the first mode to the charging circuit in operation 1105. For example, the charging unit may drop down the voltage of the charging power provided from the charger to reduce a power loss generated inside the charging circuit.

The charging unit may operate in the second mode in operation 1107.

The charging unit may provide power charged by the first mode to the charging circuit in operation 1109. For example, the charging unit may perform an operation of the second mode to allow the charged divided voltage to be input to the charging circuit.

The charging unit may determine whether external power supplying is stopped in operation 1111.

The charging unit may perform the first mode operation and the second mode operation in turns until the external power supplying is stopped.

Figure 12:
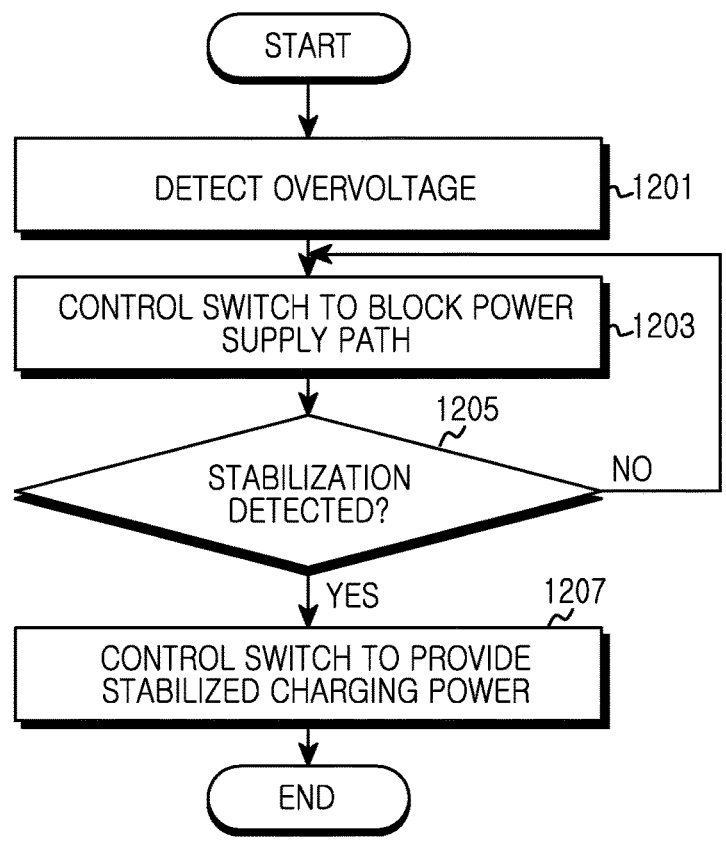
FIG. 12 is a flowchart illustrating an overvoltage prevention operation of a charging unit according to an embodiment of the present disclosure.

FIG. 12 is a flowchart illustrating an overvoltage prevention operation of a charging unit according to an embodiment of the present disclosure.

Referring to FIG. 12, to prevent power of high voltage charging power from being lost by an element forming the charging circuit, the charging unit may convert the charging power to low voltage charging power to provide the same to the charging circuit.

In addition, when overvoltage charging power is detected, the charging unit may process to block the charging power supplied to the charging circuit.

In this case, the charging circuit may include a first switch, a second switch, a third switch, and a fourth switch connected in series, and include a first capacitor connected in parallel with the second switch and the third switch, and a second capacitor connected in parallel with the third switch and the fourth switch. In addition, the charging unit may include a circuit element (for example, a zener diode, and the like) for removing a surge voltage.

The charging unit may drop down the voltage of the charging power provided from the charger as described above.

In addition, when overvoltage charging power is detected, the charging unit may control (turn off) the operation of the first switch to allow the charging power not to be provided to the charging circuit but allow the charging power to be provided to the element for removing the surge voltage.

To perform the above operation, the charging unit may determine whether overvoltage power is detected in operation 1201. The charging unit may detect charging power provided from the charger to determine whether overvoltage charging power corresponding to a certain threshold voltage or more is provided.

When determining overvoltage power is provided, the charging unit may block a power supply path so that the charging power provided from the charger may not be provided to the charging circuit in operation 1203.

The charging unit may form a power supply path using a first mode or a second mode. This mode is determined by the operation of a switch. According to an embodiment of the present disclosure, the charging unit may control (turn off) the operation of the first switch to block overvoltage charging power supplied to the charging circuit.

The charging unit may determine whether the charging power provided from the charger is stabilized in operation 1205. Here, a fact that the charging power is stabilized refers to overvoltage charging power of a threshold voltage or more is input as a voltage less than the threshold voltage.

When the charging power is not stabilized, the charging unit may block the overvoltage charging power provided to the charging circuit.

When the charging power is not stabilized, the charging unit may control (turn on) the operation of the first switch and process to allow the stabilized charging power to be provided to the charging circuit in operation 1207.

Figure 13:
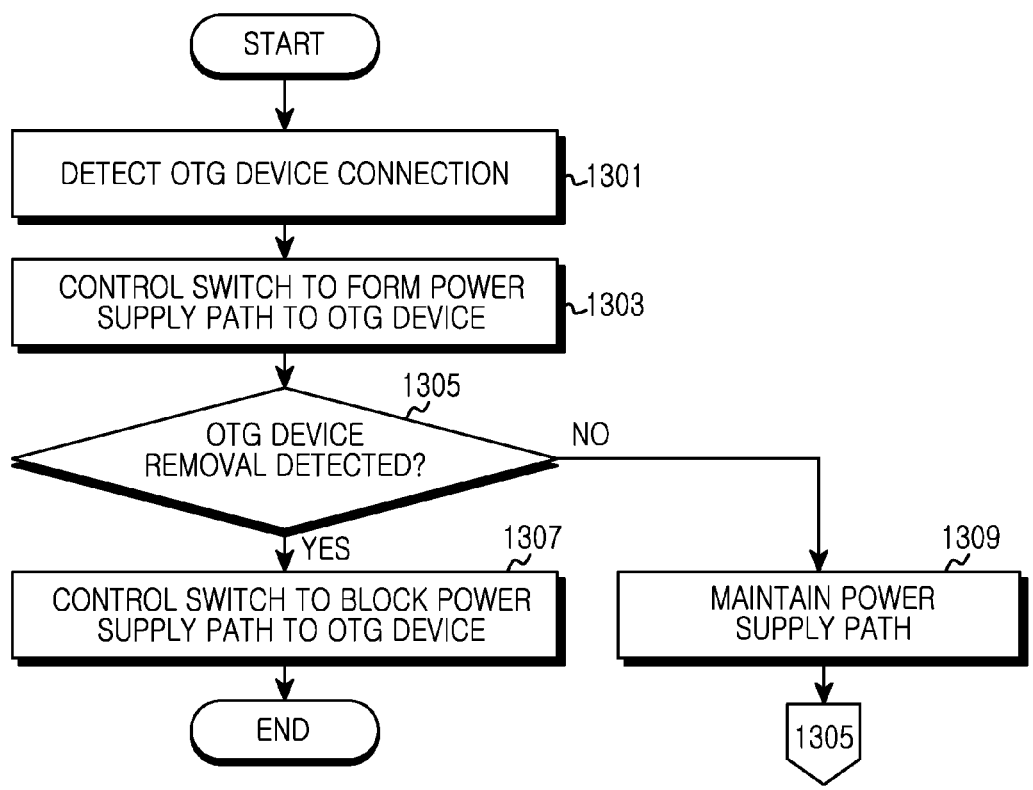
FIG. 13 is a flowchart illustrating an On-The-Go (OTG) power providing operation of a charging unit according to an embodiment of the present disclosure.

FIG. 13 is a flowchart illustrating an OTG power providing operation of a charging unit according to an embodiment of the present disclosure.

Referring to FIG. 13, to prevent power of high voltage charging power from being lost by a circuit element forming a charging circuit, the charging unit may convert the charging power to low voltage charging power to provide the same to the charging circuit.

In addition, when an OTG device is connected, the charging unit may control power provided from a battery to be provided to the OTG device connected to a connection port.

In this case, the charging unit may include a first switch, a second switch, a third switch, and a fourth switch connected in series, and include a first capacitor connected in parallel with the second switch and the third switch, and a second capacitor connected in parallel with the third switch and the fourth switch.

The charging unit may operate the first switch and the third switch to perform a first mode so that a voltage is divided to the first capacitor and the second capacitor. In addition, the charging unit may operate the second switch and the fourth switch to perform a second mode that performs a current balance operation for the first capacitor and the second capacitor.

In addition, the charging unit may operate the first switch and the second switch to perform a third mode so that a power supply path from the battery to the connection port may be formed.

For example, when the charger is connected to the connection port, the charging unit may form a power supply path that allows charging power to be provided to the charging circuit. When an OTG device is connected to the connection port, the charging unit may form a power supply path that allows the charging power of the battery to be provided to the OTG device.

To perform the above operation, the charging unit may detect connection of the OTG device in operation 1301. The charging unit may detect connection of the OTG device by detecting a signal generated when the OTG device is connected to the connection port.

When the OTG device is connected, the charging unit may form a power supply path so that power provided via the battery may be provided to the OTG device in operation 1303.

The charging unit may control (turn on) the operations of the first switch and the second switch that control a power supply path to allow power to be supplied to the OTG device.

The charging unit may determine whether an OTG device is removed in operation 1305.

When the OTG device is not removed, the charging unit may maintain a power supply path in operation 1309.

When the OTG device is removed, the charging unit may control (turn off) the operations of the first switch and the second switch controlling the power supply path to stop supplying power to the OTG device in operation 1307.

According to an embodiment of the present disclosure, a method for charging a battery of a charging apparatus may include, when charging power of a first level is supplied from a charger, converting the charging power of the first level to charging power of a second level before providing the charging power to a charging circuit, and providing the converted charging power of the second level to the charging circuit, and the first level of the charging power may be greater than the second level.

According to an embodiment of the present disclosure, an operation for converting the charging power of the first level to the charging power of the second level may be performed using a switched capacitor.

According to an embodiment of the present disclosure, the operation of converting the charging power of the first level to the charging power of the second level may include an operation of performing operations of a first mode and a second mode using the switched capacitor. The first mode is a voltage dividing operation for the charging power, and the second mode may be a current balance operation for the charging power.

According to an embodiment of the present disclosure, the operation of converting the charging power of the first level to the charging power of the second level may include an operation of changing a switching operation frequency depending on a load amount of the charging apparatus to perform the operations of the first mode and the second mode.

According to an embodiment of the present disclosure, a method for charging a battery of a charging apparatus may include, when overvoltage power is detected from a charger, an operation of blocking a charging power supply path using a switched capacitor.

According to an embodiment of the present disclosure, a method for charging a battery of a charging apparatus may include, when power needs to be supplied to an external apparatus, an operation of forming a power supply path between the battery and the external apparatus using a switched capacitor.

Each of the above-described elements of the electronic device may include one or more components, and a name of a relevant element may change depending on the kind of the electronic device. An electronic device according to the present disclosure may include at least one of the above-described elements, and some of the elements may be omitted or additional other elements may be further included. In addition, some of the elements of the electronic device according to the present disclosure may combine to form one entity and equally perform the functions of relevant elements before the combination.

A terminology used for the present disclosure, for example, a "module" may mean a unit including a combination of one or two or more of a hardware, a software, and a firmware. A "module", for example, may be interchangeably used with a terminology, such as a unit, a logic, a logical block, a component, a circuit, and the like. A "module" may be a minimum unit of an integrally formed component or a portion thereof. A "module" may be a minimum basis performing one or more functions or a portion thereof. A "module" may be implemented mechanically or electronically. For example, a "module" according to the present disclosure may include at least one of an Application-Specific Integrated Circuit (ASIC) chip, Field-Programmable Gate Arrays (FPGAs), and a programmable-logic device performing certain operations, known or to be developed in the future.

According to an embodiment of the present disclosure, at least a portion of an apparatus (ex: modules or functions thereof) or methods (ex: operations), for example, may be implemented as instructions stored in a computer-readable storage media in the form of a programming module. The instruction, when executed by one or more processors, may allow the one or more processors to perform a relevant function corresponding to the instruction. A computer-readable storage medium, for example, may be a memory. At least a portion of the programming module, for example, may be implemented (ex: executed) by the processor. At least a portion of the programming module may include, for example, a module, a program routine, a set of instructions or a process for performing one or more functions.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

A module or a programming module may include at least one of the above-described elements, or some of the elements may be omitted, or additional other elements may be further included. Operations performed by a module, a programming module, or other elements according to the present disclosure may be executed sequentially, in parallel, or in a repetitive or heuristic method. In addition, a portion of operations may be executed in different sequences, omitted, or other operations may be added.

According to an embodiment of the present disclosure, in a storage medium storing instructions, the instructions are set, when executed by at least one processor, to allow the at least one processor to perform at least one operation. The at least one operation may include an operation of, when charging power of a first level is supplied from a charger, converting the charging power of the first level to charging power of a second level before providing the charging power to a charging circuit, and an operation of providing the converted charging power of the second level to the charging circuit.

Various embodiments of the present disclosure may drop down external power of high capacity and provide the same to a charging circuit (i.e., a charging IC) to raise charging efficiency while increasing a charging speed in an electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a memory storing instructions;
a charging circuit;
a battery;
a switched capacitor comprising:
a first switch, a second switch, a third switch, and a fourth switch which are connected in series between an input node and a reference node;
a circuit element connected to the input node and the reference node in parallel with the first switch, the second switch, the third switch and the fourth switch;
a first capacitor connected in parallel with the second switch and the third switch; and
a second capacitor connected, between an output node and the reference node, in parallel with the third switch and the fourth switch; and
at least one processor configured to execute the stored instructions to:

if it is determined that an external charger is connected to the electronic device via the input node, charge the battery by:
receiving power with a first level from the external charger,
converting the power with the first level to power with a second level lower than the first level by iteratively performing, within an iteration period, a first operation to switch an operation mode of the switched capacitor from a first mode to a second mode and a second operation to switch the operation mode of the switched capacitor from the second mode to the first mode, wherein a length of the iteration period is adaptively changed based on a load amount of the electronic device,
when the switched capacitor is operating in the first mode, turning on the first switch and the third switch and turning off the second switch and the fourth switch,
when the switched capacitor is operating in the second mode, turning on the second switch and the fourth switch and turning off the first switch and the third switch,
providing the power of the second level to the charging circuit, and
charging, by the charging circuit, the battery connected to the output node using the power with the second level, and
if it is determined that another electronic device is connected to the electronic device via the input node, charge a battery of the other electronic device requiring to be supplied power by:
forming a power supply path between the input node and the output node by turning on the first switch and the second switch, and
providing the power to the electronic device via the power supply path from the battery, and
if it is determined that the overvoltage power is detected in the input node, control the first switch to be turned off to electrically divide between the input node and the second switch and to electrically connect the circuit element and the input node,
wherein the iteration period is decreased if the load amount of the electronic device is less than a threshold value, and
wherein the iteration period is increased if the load amount of the electronic device is greater than the threshold value.

2. The electronic device of claim 1, wherein the switched capacitor is further configured to perform the first mode where a voltage is divided to the first capacitor and the second capacitor, and the second mode that performs a current balance operation for the first capacitor and the second capacitor.

3. The electronic device of claimer 1, wherein the switched capacitor is further configured to form the power supply path by operating the first switch and the second switch connected in series.

* * * * *